Patented Jan. 6, 1948

2,434,056

UNITED STATES PATENT OFFICE 2,434,056

PREPARATION OF ANTHRIMIDE-CARBAZOLE DYESTUFFS

Glen M. Smyth and John Francis Cullinan, Plainfield, N. J., assignors to American Cyanamid Company, New York, N. Y., a corporation of Maine No Drawing. Application October 16, 1943, Serial No. 506,572

18 Claims. (Cl. 260—316)

This invention relates to an improved process of preparing vat dyestuffs of the anthrimide-carbazole series, and more particularly it relates to an improved process for effecting ring closure of di- and polyanthrimides to form the corresponding carbazoles.

Many dyes of the anthrimide-carbazole series are known and in general the ring closure step in preparing these dyestuffs is effected by the use of aluminum chloride. However, much difficulty has been encountered in the preparation of anthrimide-carbazoles because the reaction is highly exothermic and many of the polyanthrimides and resulting carbazole dyestuffs are solids of high melting points. As a result larger particles may react only at the surface, leaving unreacted polyanthrimide in the center and the control of the exothermic reaction is unsatisfactory, leading to local overheating.

In the past a number of procedures have been proposed to obviate the difficulties involved in the reaction. For example, it has been proposed to carry out the reaction in a solution of nitrobenzene. This gives a smoother process, but is not technically practical at high temperatures because of the great explosion hazard. Another process involves the use of liquid sulfur dioxide. This obviates explosion hazards, but seriously complicates the apparatus, requiring an elaborate cooling system and difficulties in recovering the $SO_2$. Certain other expensive compounds, such as pyridine, organic nitriles and acid halides, have also been proposed. However, the high cost of these solvents or diluents has precluded their practical use, except in a few restricted cases, and in the case of many polyanthrimides the reactions do not go to completion.

It has also been proposed to prepare fusions with aluminum chloride and sodium chloride but these processes do not permit dilution of the aluminum chloride at will, require a large quantity of aluminum chloride, and are unsatisfactory from a manipulative standpoint.

According to the present invention we have found that all of the difficulties in the ring closure step are obviated and a smooth, readily controlled reaction obtained if a solvent is used the essential constituent of which is trichlorbenzene. It is an advantage of the present invention that the trichlorbenzene need not be pure. On the contrary a technical product may be used which not only contains various isomeric trichlorbenzenes, but also contains certain amounts of lower and higher chlorination products of benzene. Throughout the specification and claims the medium of the present invention will be referred to as one which contains trichlorbenzene as its main and essential ingredient.

The trichlorbenzenes used in the present invention have excellent solvent action on aluminum chloride at the elevated temperature at which the reactions are run and they are inert in the sense that they do not interfere with the reaction. The high content of halogen obviates any explosion hazard or even serious fire hazard. They are cheap and easily recoverable.

The present invention produces improved results with all polyanthrimide ring closure reactions, and in addition it permits for the first time the practical production of certain polyanthrimide carbazole dyestuffs, for example that obtained from 1″,4′,1′,1,4,1‴,8,1″″-pentanthrimide, which dyestuff cannot be produced by other known ring closure methods. In the case of other polyanthrimide dyestuffs products of improved shade and brightness are obtainable by the process of the present invention.

A further advantage of this process is that ring closure takes place at a lower temperature than it does with aluminum chloride-sodium chloride melts, to yield purer, brighter and more valuable dyestuffs. This is especially true in case of the 1,4,5,8,1′,1″,1‴,1″″-pentanthrimide which yields the valuable dyestuff Vat Khaki 2G, by this method, of great purity in a smooth easily controlled reaction.

It is a further advantage of the present invention that it may be used with an anhydrous acid binding substance, such as an alkali metal carbonate, examples of which are sodium and potassium carbonates. The carbonate partially neutralizes the hydrogen chloride evolved in the ring closing reaction and at the same time evolves carbon dioxide which keeps the mixture agitated and helps to expose fresh surfaces of anthrimide.

While not limited thereto, we find that it is desirable to mix the anthrimide and anhydrous carbonate dry and add this blended mixture to a liquified mixture of trichlorbenzene and aluminum chloride which has been preheated to reaction temperature. This produces the best reaction conditions and the smoothest operation. However, it is entirely possible to add the anthrimide and alkali metal carbonate separately in alternate portions. Another modification is to heat up the trichlorbenzene to reaction temperature and add a dry blend of anthrimide and alkali metal carbonate in alternating portions with aluminum chloride. It is also possible to suspend the anthrimide in the trichlorbenzene, heat the mixture to reaction temperature and add alternate portions of aluminum chloride and alkali metal carbonate. The great flexibility of the process is an advantage as it permits the choice of optimum reaction conditions for each particular dyestuff.

While the present invention is applicable generally to the ring closure of di- and polyanthrimides to the corresponding carbazoles, it is particularly useful with the following anthrimides: 1,1'-dianthrimide, 1,1',4',1''-trianthrimide, 1,1',-5',1''-trianthrimide, 1,4,5,8,1',1'',1''',1''''-pentanthrimide, and 1'',4',1',1,4,1''',8,1''''-pentanthrimide.

The last of these compounds is not claimed in the present invention but forms a part of the copending application of Glen M. Smyth, Serial No. 506,571, filed October 16, 1943, now U. S. Patent 2,385,113.

The invention will be described in greater detail in conjunction with the following specific examples, the parts being by weight.

*Example 1*

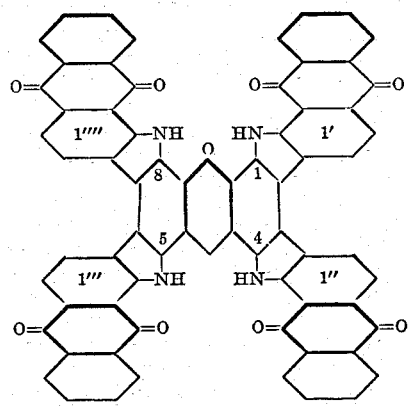

109.2 parts of 1,4,5,8,1',1'',1''',1''''-pentanthrimide are well mixed with 54 parts finely powdered anhydrous sodium carbonate. This mixture is added to a solution of 540 parts of powdered anhydrous aluminum chloride in 1,092 parts of anhydrous commercial trichlorobenzene at 145–150° C. This addition is made at such a rate that the temperature does not rise above 165° C. When about 70% of the mixture has been added the reaction rate increases somewhat bringing the temperature up to 170° C. The addition is continued and finished at such a rate that the temperature is kept at about 165°–170° C. The whole addition takes approximately one hour. After the charge is agitated for ½ hour longer at 165° C. it is quenched in 3,000 parts of cold water, the slurry being agitated. The product is filtered and washed free from aluminum chloride and acid with water. The trichlorbenzene adhering to the filter cake is removed by steam stripping in strong alkaline medium. Then the product is filtered again, washed neutral and dried. The yield is nearly quantitative but the observed weight may be slightly higher than expected in case the filter cake still retains some aluminum. The trichlorobenzene may be easily separated from the aqueous filtrate and after drying used again.

The crude dyestuff is pulverized and added slowly to 20 parts of 98% sulfuric acid at 100–110° C. The mixture is stirred at this temperature until complete solution is effected. It is then run into 120 parts of cold water. The precipitated dyestuff may be brightened by adding ¼–1 parts of sodium bichromate to the acid slurry and heating it to 90° C. until the desired shade is obtained. Then the slurry is diluted with an equal volume of cold water and the product is filtered and washed acid free. The final yield is nearly quantitative. The dyestuff is of high purity and dyes greener and brighter shades than the dyestuffs made by methods of the prior art.

One of the reasons for the improved shade and greater brightness of the dyestuff prepared by the procedure of the present invention probably lies in the fact that it can be carried out at a substantially lower temperature than when an aluminum chloride sodium chloride fusion process is used. At the higher temperatures the tendency is to produce a dull and weak dyestuff unless the reaction is interrupted at exactly the right time, which is very difficult. When trichlorbenzene is used as a solvent, the reaction temperature is lower and the exothermic reaction frees just the right amount of heat to complete the ring closure and permits the use of much smaller amounts of aluminum chloride.

*Example 2*

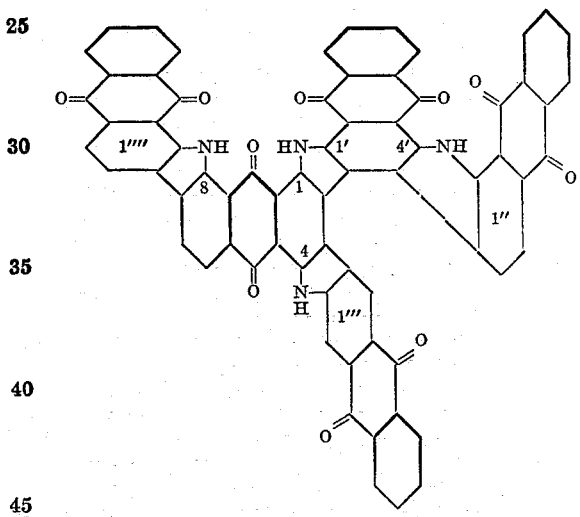

109.2 parts of 1'',4',1',1,4,1''',8,1''''-pentanthrimide and 54 parts of powdered anhydrous sodium carbonate are ground together and added to a mixture of 550 parts anhydrous aluminum chloride in 550 parts anhydrous commercial trichlorbenzene. The addition is started at 160° C. and is continued at such a rate that the exothermic reaction carried the temperature to 200° C. during the addition. The charge is held at 200° C. for 15 minutes and then quenched in 3,000 parts of cold water.

The product is filtered and washed. Trichlorbenzene adhering to the filter cake is removed in a steam stripper after the filter cake has been slurried with strong alkali. The dyestuff is then filtered again, washed neutral and dried. The yield is practically quantitative. The polycarbazole may be acid pasted from 10–20 parts of concentrated sulfuric acid at temperatures ranging from room temperature to 190° C. without materially affecting the shade.

The product obtained is black, giving with alkaline sodium hydrosulfite a brown colored vat from which cotton is dyed a very fast and desirable greenish olive drab shade of great intensity.

This pentanthrimide is not a previously known chemical compound but may be obtained by the following steps: 8-nitro-1-chloroanthraquinone is condensed with alpha aminoanthraquinone in boiling nitrobenzene in the presence of a cupriferous catalyst and an acid binder such as alkali metal carbonate and alkali metal acetate. The 8-nitro-1,1'-dianthrimide thus obtained is nitrated by the addition of mixed acid in the presence of boric acid dissolved in sulfuric acid. The resulting 4,4',8-trinitro-1,1'-dianthrimide is reduced with alkali metal sulfide to the corresponding triamino compound which in turn is condensed with 3 molecules alpha chloroanthraquinone by heating in nitrobenzene in the presence of a cupriferous catalyst and an acid binder such as alkali metal carbonate or alkali metal acetate.

*Example 3*

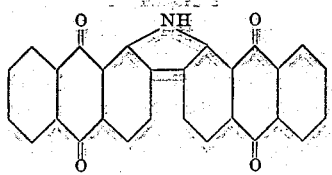

An intimate mixture of 30 parts of anhydrous sodium carbonate and 60 parts of 1,1'-dianthrimide is charged into a mixture of 300 parts of aluminum chloride and 300 parts of anhydrous commercial trichlorobenzene at 150° C. over a period of 45 minutes; the temperature rising to 160° C. After complete addition the charge is kept for one hour longer at 150° C. It is then drowned in 3,000 parts of cold water. The product is filtered and washed free of acid. The press cake is freed from adhering trichlorobenzene by steam stripping in alkaline medium. Then the dyestuff is filtered again and washed and the resulting brown product is finely dispersed by acid pasting. A slurry of this product is treated with an oxidizing agent such as sodium hypochlorite and gives a dyestuff dyeing cotton pure yellow shades.

*Example 4*

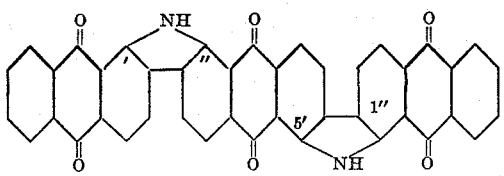

An intimate mixture of 30 parts 1,1',5',1"-trianthrimine and 15 parts of anhydrous sodium carbonate is added to a mixture of 210 parts anhydrous aluminum chloride and 210 parts of trichlorobenzene at 150° C. over a period of 30 minutes. During the addition the temperature rises gradually to 168° C. After the addition is completed the charge is held at 150° for one hour longer. Then it is quenched in 2,000 parts of cold water. The purplish black product is filtered, washed free of acid and free from trichlorobenzene as described in the previous examples. The crude dyestuff obtained in quantitative yield is dispersed by acid pasting. An aqueous slurry of the finely defined product is treated with sodium hypochlorite and then gives a dyestuff that dyes cotton reddish yellow shades.

*Example 5*

120 parts of anhydrous aluminum chloride is dissolved in 200 parts commercial trichlorobenzene by heating to 180° C. 20 parts of the pentanthrimide used in Example 1 is then slowly added at 180–185° C. in about 15–20 min. After the addition the temperature is raised to 190° C. and held at this temperature one half hour. The charge is then drowned in 2000 parts of cold water. This slurry is then filtered, most of the water and of the trichlorobenzene going into the filtrate. The residual trichlorobenzene is then removed from the cake by stripping with steam. The cake obtained after filtering the stripper slurry, is reslurried in 800 parts of hot water. 276 parts of 98% sulfuric acid and then 10 parts of sodium bichromate are added. The slurry is stirred at 90° C. until a test on starch iodide paper shows only faint, blue color. 12 parts more sodium bichromate is then added. The test on starch iodide paper now remains positive after 8 hours heating at 90° C. The slurry is then filtered and the cake is washed until acid free and dried.

The dyestuff dyes on cotton a khaki shade brighter than is obtained from similar commercial products.

We claim:

1. A process of converting a compound belonging to the group consisting of dianthrimides and polyanthrimides into the corresponding carbazoles, which comprises heating the anthrimide in the presence of anhydrous aluminum chloride in a liquid medium containing trichlorbenzene as its principal ingredient.

2. A process of converting a polyanthrimide into the corresponding carbazole, which comprises heating the polyanthrimide in the presence of anhydrous aluminum chloride in a liquid medium containing trichlorbenzene as its principal ingredient.

3. A process of converting a pentanthrimide into the corresponding carbazole, which comprises heating the pentanthrimide in the presence of anhydrous aluminum chloride in a liquid medium containing trichlorbenzene as its principal ingredient.

4. A process of converting a 1,4,5,8,1',1",1"',1""-pentanthrimide into the corresponding carbazole, which comprises heating the 1,4,5,8,1',1",1"',1""-pentanthrimide in the presence of anhydrous aluminum chloride in a liquid medium containing trichlorbenzene as its principal ingredient.

5. A process of converting a 1",4',1',1,4,1"',8,1""-pentanthrimide into the corresponding carbazole, which comprises heating the 1",4',1',1,4,1"', 8,1""-pentanthrimide in the presence of anhydrous aluminum chloride in a liquid medium containing trichlorbenzene as its principal ingredient.

6. A method according to claim 1 in which the reaction mixture contains sufficient anhydrous alkali metal carbonate theoretically to react with at least a major portion of the hydrogen chloride evolved by the reaction.

7. A method according to claim 2 in which the reaction mixture contains sufficient anhydrous alkali metal carbonate theoretically to react with at least a major portion of the hydrogen chloride evolved by the reaction.

8. A method according to claim 3 in which the reaction mixture contains sufficient anhydrous alkali metal carbonate theoretically to react with at least a major portion of the hydrogen chloride evolved by the reaction.

9. A method according to claim 1 in which a dry mixture of finely divided anthrimide and anhydrous alkali metal carbonate is added to a mixture of aluminum chloride and the trichlorbenzene liquid preheated to the reaction temperature, the amount of alkali metal carbonate being sufficient theoretically to neutralize at least a major portion of the hydrochloric acid evolved by the reaction.

10. A method according to claim 2 in which a dry mixture of finely divided anthrimide and anhydrous alkali metal carbonate is added to a mixture of aluminum chloride and the trichlorbenzene liquid preheated to the reaction temperature, the amount of alkali metal carbonate being sufficient theoretically to neutralize at least a major portion of the hydrochloric acid evolved by the reaction.

11. A method according to claim 3 in which a dry mixture of finely divided anthrimide and anhydrous alkali metal carbonate is added to a mixture of aluminum chloride and the trichlorbenzene liquid preheated to the reaction temperature, the amount of alkali metal carbonate being sufficient theoretically to neutralize at least a major portion of the hydrochloric acid evolved by the reaction.

12. A method according to claim 4 in which a dry mixture of finely divided anthrimide and anhydrous alkali metal carbonate is added to a mixture of aluminum chloride and the trichlorbenzene liquid preheated to the reaction temperature, the amount of alkali metal carbonate being sufficient theoretically to neutralize at least a major portion of the hydrochloric acid evolved by the reaction.

13. A method according to claim 5 in which a dry mixture of finely divided anthrimide and anhydrous alkali metal carbonate is added to a mixture of aluminum chloride and the trichlorbenzene liquid preheated to the reaction temperature, the amount of alkali metal carbonate being sufficient theoretically to neutralize at least a major portion of the hydrochloric acid evolved by the reaction.

14. A method according to claim 4 in which the reaction takes place in the presence of an amount of anhydrous alkali metal carbonate sufficient theoretically to neutralize at least a major portion of the hydrochloric acid evolved in the reaction and the reaction temperature is maintained between 135 and 180° C.

15. A method according to claim 5 in which the reaction takes place in the presence of an amount of anhydrous alkali metal carbonate sufficient theoretically to neutralize at least a major portion of the hydrochloric acid evolved in the reaction and the reaction temperature is maintained between 150 and 210° C.

16. A method according to claim 1 in which the reaction takes place in the presence of sufficient sodium carbonate theoretically to react with at least a major portion of the hydrochloric acid evolved in the reaction.

17. A method according to claim 2 in which the reaction takes place in the presence of sufficient sodium carbonate theoretically to react with at least a major portion of the hydrochloric acid evolved in the reaction.

18. A method according to claim 3 in which the reaction takes p'ace in the presence of sufficient sodium carbonate theoretically to react with at least a major portion of the hydrochloric acid evolved in the reaction.

GLEN M. SMYTH.
JOHN FRANCIS CULLINAN.